United States Patent
Ward et al.

(10) Patent No.: US 6,945,851 B2
(45) Date of Patent: *Sep. 20, 2005

(54) CMP FORMULATIONS

(75) Inventors: Doug Ward, Santa Ana, CA (US);
David Solomos, Yorba Linda, CA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/831,946

(22) Filed: Apr. 26, 2004

(65) Prior Publication Data

US 2005/0020187 A1 Jan. 27, 2005

Related U.S. Application Data

(63) Continuation of application No. 10/080,853, filed on Feb. 22, 2002, now Pat. No. 6,755,721.

(51) Int. Cl.⁷ .................................................. B24B 1/00
(52) U.S. Cl. ........................................... 451/28; 451/36
(58) Field of Search ............................... 451/28, 60, 36; 51/307, 308, 309; 438/690, 692, 693

(56) References Cited

U.S. PATENT DOCUMENTS

| | | | |
|---|---|---|---|
| 5,437,887 A | 8/1995 | Yarkosky et al. | |
| 6,423,125 B1 | 7/2002 | Ishibashi et al. | |
| 6,461,227 B1 | 10/2002 | Fang | |
| 6,471,884 B1 | 10/2002 | Fang et al. | |
| 6,569,215 B2 | 5/2003 | Miyata | |
| 6,755,721 B2 * | 6/2004 | Ward et al. | 451/28 |
| 2001/0049913 A1 | 12/2001 | Miyata | |
| 2003/0134575 A1 | 7/2003 | Fang | |

FOREIGN PATENT DOCUMENTS

| | | |
|---|---|---|
| EP | 0 280 438 A2 | 8/1998 |
| WO | WO 01/12740 | 2/2001 |
| WO | WO 01/36554 A1 | 5/2001 |
| WO | WO 01/74959 A2 | 10/2001 |
| WO | WO 03/31527 | 4/2003 |

* cited by examiner

*Primary Examiner*—Dung Van Nguyen
(74) *Attorney, Agent, or Firm*—Toler, Larson & Abel, LLP; Joseph P. Sullivan

(57) ABSTRACT

CMP formulations for use on nickel/phosphorus alloys comprising abrasive particles and an oxidant, a modifier for the action of the oxidant and first and second accelerants to sequester removed materials containing phosphonate and ammonium or amine groups respectively and optionally an organic carboxylic acid.

28 Claims, 2 Drawing Sheets

CM P FORMULATIONS

CROSS-REFERENCE TO RELATED APPLICATIONS

The present application is a of U.S. patent application Ser. No. 10/080,853, filed Feb. 22, 2002 now U.S. Pat. No. 6,755,721, entitled "Improved Mechanical Polishing of Nickel Phosphorous Alloys," naming inventors Douglas Edwin Ward and David Solomos, which application is incorporated by reference herein in its entirety.

TECHNICAL FIELD OF THE INVENTION

This invention relates to CMP ("chemical mechanical planarization") materials and specifically to CMP materials for use in treating nickel-phosphorous alloys. The specific alloys targeted by the present invention are known as high-phosphorus alloys and contain 9 to 12 wt % of phosphorus, such alloys are conventionally deposited via an auto catalytic nickel plating process, typically called electroless nickel plating. Specifically in the manufacture of hard disks for hard-disk-drives (memory storage media), said nickel-phosphorous alloys are deposited on an aluminum substrate.

BACKGROUND OF THE INVENTION

To manufacture hard disk drives, certain processes require an electroless nickel-plated substrate to demonstrate a highly planar surface. "Planarity" is quantified through the measurement of "waviness", "flatness" and "roughness". In addition to planarity, certain criteria determine the further processing of post electroless nickel-plated, aluminum substrates. In totality, these criteria are "waviness", "roughness", "outer diameter curvature", "flatness" and surface defects. Waviness, roughness, outer diameter curvature and flatness are to be at a minimum in this context. Surface defects such as "pits", "bumps" and "scratches" are defined by any disruption in the nickel-phosphorus lattice, which has a depth or height greater than or equal to twelve angstroms. In addition to seeking a planar surface that is void of surface defects, the CMP process of nickel-phosphorous plated, aluminum substrates must be accomplished in an efficient manner with respect to cycle time and labor intensity.

Currently available CMP formulations have not succeeded in removing a Ni—P layer at an adequate rate when using abrasive particles consistent with achieving an adequately planar surface. In practical terms this means abrasive particle sizes of from 15 to 120 nanometers. As a result the tendency has been to use abrasives with a larger particle size to reduce the mean distance from "peaks" to "valleys" across the nickel-phosphorous surface very rapidly and follow with a process using particles with a range from 15–120 nm to create a "fine" finish with respect to planarity and surface defects. A "fine" finish is defined by the optimum surface condition available to this specific process.

The CMP formulation of this invention is specifically designed to create a surface on a nickel-phosphorous layer that is suitable in all respects for further operations in the fabrication of a superior electronic component. Specifically it is capable of producing a highly uniform, minimum waviness surface in a one-step operation. It does this by using a CMP formulation that greatly increases the material-removal effectiveness of abrasives with particle sizes more usually associated with the later polishing operation.

Normally in this context the CMP surface-generating process is accomplished in two operations: a first involving aggressive material removal until an approximate level is achieved and thereafter a more gentle process in which the desired surface finish, in terms of low surface roughness and micro-waviness, is pursued. The solutions used in the first polishing stage are frequently comprised of abrasive particles, (usually of alumina), with a particle size of from about 0.3 to 0.44 micrometers, and a chemical accelerant. The second action is a planarization action in which the surface defects created by the first material removal action are removed and a surface with an acceptable pre-determined smoothness and minimal waviness is created. This second stage of polishing is typically accomplished, using a finer abrasive (colloidal silica) and a chemical accelerant, in the presence of an oxidizer.

The two sequential operations can take a substantial amount of time and are labor intensive. As a two-step process also requires more handling of the substrates surface defects are commonly introduced by human handling and transport of the product. It is therefore desired to fabricate a process where a substrate is properly processed via CMP in one step and on a single piece of equipment. A suitable formulation meeting these criteria has now been devised which can be used on a nickel/phosphorus alloy surface to create a finish equivalent to that obtained using a conventional two-stage process, in the same as or reduced time frame.

GENERAL DESCRIPTION OF THE INVENTION

Figure 1:
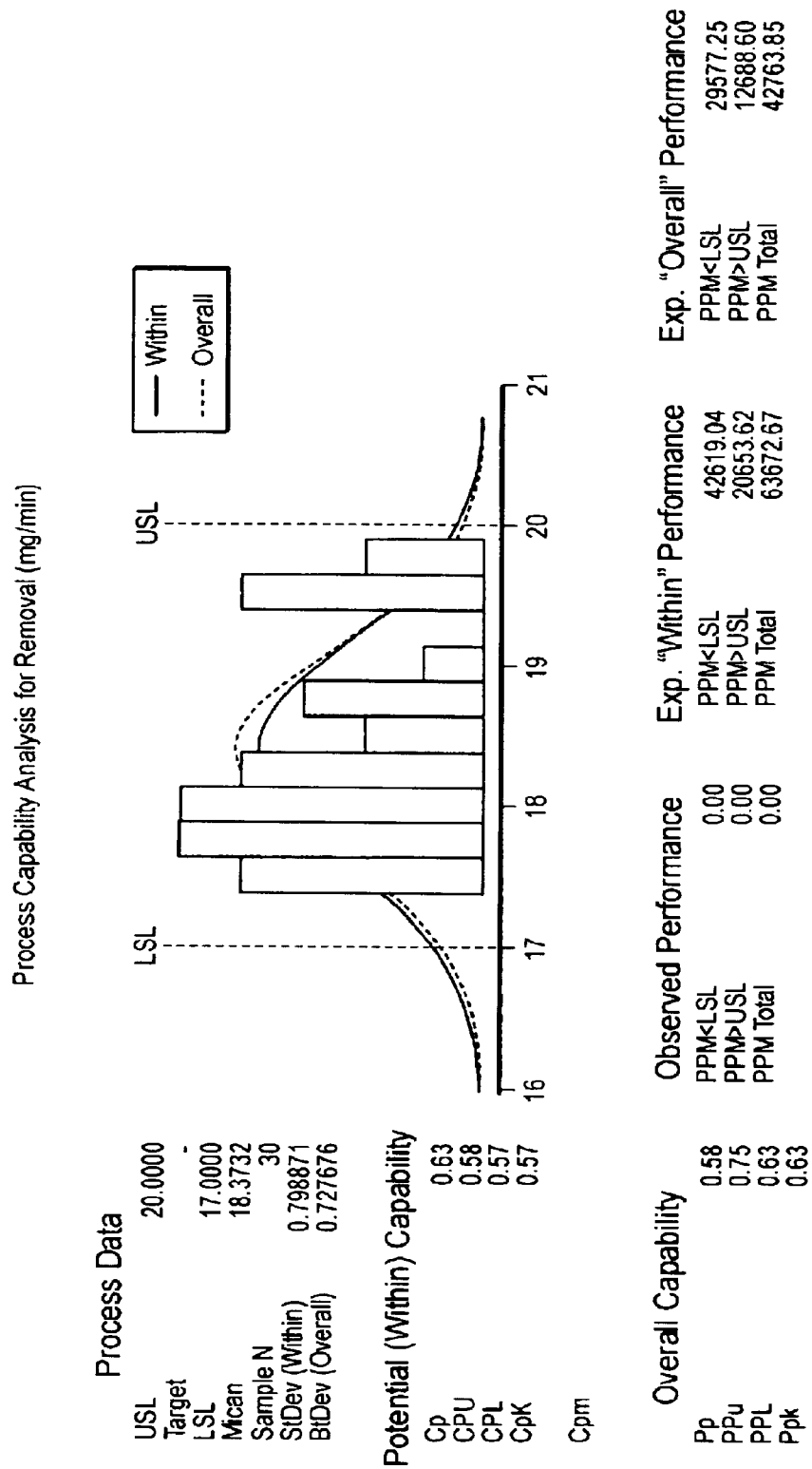
FIG. 1 is a statistical analysis diagram of removal rate data.

The present invention provides a CMP formulation for the treatment of a nickel/phosphorus alloy which comprises a dispersion of abrasive particles with particle sizes from 15 to 80 nanometers and selected from the group consisting of silica, alumina, titania, ceria, zirconia and mixtures thereof dispersed in a formulation having a pH of from 2.4 to 2.6 comprising:

a. an oxidizer;
b. a chemical accelerant comprised of four groups:
 (1) a phosphonate
 (2) a carboxylic acid
 (3) a phosphate or phosphite
 (4) an amine
c. water.

The invention further comprises a single-step process comprising subjecting a nickel-phosphorus alloy containing from 9 to 12% phosphorus deposited on a substrate to a CMP process using a formulation as described above.

In preferred formulations according to the invention the formulation comprises an organic carboxylic acid. This compound attacks the surface and makes removal of the alloy more easily accomplished. Examples of suitable acids include citric acid, oxalic acid, lactic acid, tartaric acid, glycine and mixtures of such acids.

The formulations of the invention are carefully balanced to provide that the attack of the oxidant, (and any organic carboxylic acid present), on the nickel-phosphorus alloy surface is not so vigorous that material is removed in uncontrollable amounts that can not be adequately sequestered by the phosphonate group in the accelerant which is a chelating agent effective to chelate nickel removed from the surface of the nickel-phosphorus alloy and prevent re-deposition, or increase solubility by reacting with ligand providing components in the formulation. An important element of the balance is to maintain the pH at the above level and the level of the second accelerant plays an important role in this regard.

In selecting the oxidant, the most preferred example is hydrogen peroxide because of the purity of the product and because it leaves little or no residue. However other know oxidants, such as periodates, sulphurous acid and percarbamates, can be used in partial or complete substitution for hydrogen peroxide unless there is a compatibility problem as is the case for mixtures of hydrogen peroxide and potassium periodate. The preferred oxidant is however hydrogen peroxide and most preferably in the form of a 35% by weight solution in water.

The moderator for the activity of the oxidant comprises a phosphite or phosphate group having the group —$PO_x$, where x is from 1 to 4. The preferred exemplar is phosphoric acid, (including the meta-, ortho-, and pyrophosphoric acid versions).

The accelerant also comprises chelating phosphonate groups and suitable examples include 1-hydroxyethylidene-1,1-diphosphonic acid (HEDP), aminotri (methylenephosphonic acid) (ATMP), N-(2-hydroxyethyl)-N,N-di (methylenephosphonic acid) (HEMPA) and 2-phosphonobutane-1,2,4-tricarboxylic acid (PBTC).

Of these HEDP is preferred. This component increases the solubility of the nickel removed from the surface and aids in producing a clean surface readily flushed clean of all CMP residues.

The accelerant also comprises amine, amide or ammonium groups and suitable exemplars of such compounds include ammonium hydroxide, ammonium salts such ammonium nitrate, urea, formamide acetate, biuret, ethylene diamine and glycine. Mixtures of such compounds can also be used. This compound also acts as a ligand to keep nickel in a soluble form after removal from the surface.

The amounts of the components in the formulation are preferably as follows:
Abrasive: from 2 to 10 and more preferably from 3 to 6 wt. %;
Oxidizer: from 1 to 6 wt. % and preferably 1 to 4 wt % of the active oxidant.
Phosphate or Phosphite: from 0.1 to 6 and more preferably from 0.1 to 4 wt. %;
Phosphonate: from 0.1 to 6 and more preferably from 0.1 to 4 wt. %;
Amine, Amid, Amide or Ammonium: from 0.1 to 6 and more preferably from 0.1 to 4 wt. %; and
Organic Carboxylic Acid: from 0.1 to 6 and more preferably from 0.1 to 4 wt. %.
Water: The balance up to 100 wt. %

The most preferred abrasive component of the mixture for use on nickel-phosphorus substrates is silica, having a mean particle size of 15 to 120 nm, preferably from 15 to 80 nm and most preferably from 15 to 60 nanometers. The most suitable silicas have mono-dispersed, essentially spherical particles. Two suitable silica solutions are available as 30% by weight solid dispersions. A-Green Corp. and DuPont AirProducts NanoMaterials manufacture these products under the trade names BESIL-38A and Syton HD-700 respectively. Of these solutions, Syton HD-700 is preferred.

DESCRIPTION OF PREFERRED EMBODIMENTS

EXAMPLES

A statistically analytical approach was utilized to formulate this invention. In order to eliminate excess variables in the development process, certain equipment and parameters were held constant. These equipment and their parameters were as follows:

TABLE A

| | |
|---|---|
| Polish Machine | Speedfan 9h-5 |
| Lower Platen Speed | 4.0 rpm |
| Sun Gear Radius | 3.5 Inches |
| Sun Gear Speed | 9.5 rpm |
| Ring Gear Speed | 8.5 rpm |
| Carrier Diameter | 9 inches |
| Number of Work Pieces | 6 |
| Total Down Force | 48 kg |
| Process Time | 6 minutes |
| Ramp to Down Force | 20 seconds |
| Total Slurry Flow-Rate | 126 mL/min |
| Polish Pad | Rodel - DPM 1000 |
| Roughness Measurement | Schmitt TMS |
| Removal Measurement | Satorius 3100S Balance |
| Cleaning Machine | Oliver Singe Rail Double-Spaced |
| Number of Work Pieces | 10 |
| Brush Pressure (air) | 40 psi |
| Soap Time | 1 sec |
| Rinse Time (D1 spray) | 1 sec |
| Detergent | AmberClean 527-L |
| Drying Machine | Semitool Stand-Alone Dryer |
| Rotor Speed | 2700 rpm |
| Rinse Cycle | 30 sec |
| DI Flow Rate | .5 gpm |
| Dry Cycle | 180 sec |
| Air Pressure | 60 psi |

The procedure by which slurry was evaluated through this development process is depicted in the flow chart below:

TABLE B

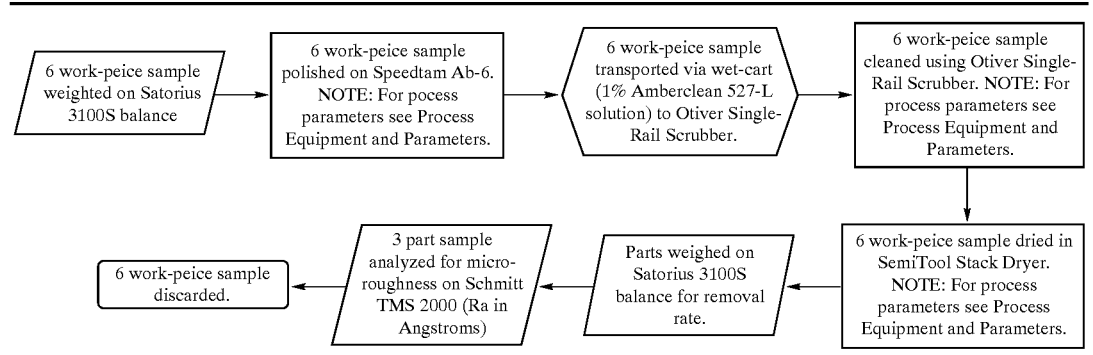

Silica Slurry Evaluation Process Flow Diagram

In addition to holding the procedures and process equipment and process equipment and parameters constant, the concentration of colloidal silica was held constant at 5.71 percent by weight. This is to say that in every iteration of slurry, the concentration of colloidal silica by weight was held constant at 5.71 percent.

Example 1

This example illustrates the contribution to removal rate by individual chemical groups in the presence of an oxidizer. An initial screening was to be performed involving forty-eight different constituents. At this initial stage of testing, the concentration of hydrogen peroxide as a thirty-five percent by weight solution was held constant at 2.57. This is to say that during the first phase of the slurry development process hydrogen peroxide in the form of a thirty-five percent by weight solution was held constant in every iteration of slurry at a total percentage by weight of 2.57. Each of the remaining forty-seven constituents was evaluated as a one percent by weight solution comprised of silica as described above, hydrogen peroxide as described above, the specific constituent and the remaining weight percent water. A listing of these constituents and the product codes assigned to them are found in table 1a. The procedure by which each of these constituents was evaluated is according to the Process Flow Diagram depicted in table B. Removal rate data in the form of total grams removal was collected from each slurry evaluated. This data was then analyzed by analysis of variance and a p-value obtained. A p-value of 0.00 was observed indicating that there was greater difference in removal data from slurry to slurry than within the data set acquired for an individual slurry. This is to say that there is sufficient statistical data to make inferences about the performance of each slurry. The data concerning the total removal of the nickel-phosphorous layer facilitated by each slurry is displayed in table 1b.

TABLE 1a

| Date Run | Code Name | Accelerants | Comments |
|---|---|---|---|
| Mar. 07, 2001 | A0 | Hydrogen peroxide, 35% | |
| | A1 | Ammonium nitrate | |
| | A2 | Hydroxylamine nitrate, 50% | |
| | A3 | Monoethanolamine | |
| Mar. 09, 2001 | A4 | Guanidine carbonate | |
| | A5 | Ethylenediamine | |
| | A6 | Aluminum nitrate, 9hydrate | |
| | A7 | Calcium nitrate, 4hydrate | |
| | A8 | Ceric ammonium nitrate | |
| Mar. 12, 2001 | A9 | Chrome III nitrate, 9hydrate | |
| | A10 | Copper II nitrate, 3hydrate | |
| | A11 | Magnesium nitrate, 6hydrate | |
| | A12 | Nickel nitrate, 6hydrate | |
| Mar. 14, 2001 | A13 | Potassium nitrate | |
| | A14 | Potassium stannate, 3hydrate | Incompatibility with hydrogen peroxide, not evaluated |
| | A15 | Zinc II nitrate, 6hydrate | |
| | A16 | Cyanic acid | Possible safety issues existed, not evaluated |
| Mar. 16, 2001 | A17 | HEDP, 60% aqueous | |
| | A18 | Ammonium fluoroborate | |
| | A19 | Sodium fluorophosphate | |
| | A20 | HPA, 50% aqueous | |
| | A21 | Potassium iodate | |
| Mar. 19, 2001 | A22 | Potassium periodate | Incompatibility with hydrogen peroxide, not evaluated |
| | A23 | Phosphoric acid, 85% aqueous | |
| | A24 | Sodium selenate | |
| | A25 | Ammonium thiocyanate | |
| | A26 | Ammonium vanadate | Possible safety issues existed, not evaluated |
| Mar. 20, 2001 | A27 | Citric acid | |
| | A28 | L-Cysteine | |
| | A29 | Glycine | |
| | A30 | Lactic acid | |
| | A31 | Oxalic acid | |
| Mar. 21, 2001 | A32 | Tartaric acid | |
| | A33 | Hydrogen peroxide, 35% | |
| | A34 | Urea | |
| | A35 | Oxamide | Possible safety issues existed, not evaluated |
| | A36 | Cyanamide | Possible safety issues existed, not evaluated |
| Mar. 22, 2001 | A37 | Dimethylglyoxime | Incompatibility with hydrogen peroxide, not evaluated |
| | A38 | Manganese II nitrate, 50% | |
| | A39 | Zirconyl nitrate | Incompatibility with hydrogen peroxide, not evaluated |
| | A40 | Tin IV oxide, 15%, 15 nm | |
| Mar. 23, 2001 | A41 | Formamid Acetate | |
| | A42 | Formamid Sulfinic Acid | Not evaluated due to unavailability of raw materials |

TABLE 1a-continued

| Date Run | Code Name | Accelerants | Comments |
|---|---|---|---|
| | A43 | Mayoquest 1320 | |
| | A44 | Mayoquest 2100 | |
| | A45 | Taurine | |
| | A46 | Biuret | |
| | A47 | Mayoquest 1200 | Not evaluated due to unavailability of raw materials |

TABLE 1b

Analysis of Variance for Removal

| Source | DF | SS | MS | F | P |
|---|---|---|---|---|---|
| Slurry A | 36 | 2.827991 | 0.078555 | 227.07 | 0.000 |
| Error | 74 | 0.025600 | 0.000346 | | |
| Total | 110 | 2.853591 | | | |

Individual 95% CIs For Mean Based on Pooled StD

| Level | N | Mean | StDev | |
|---|---|---|---|---|
| 0 | 3 | 0.23667 | 0.00577 | *) |
| 1 | 3 | 0.34667 | 0.01528 | (*) |
| 2 | 3 | 0.40333 | 0.01155 | (*) |
| 3 | 3 | 0.33333 | 0.02082 | (*) |
| 4 | 3 | 0.29667 | 0.01528 | (*) |
| 5 | 3 | 0.41333 | 0.02309 | (* |
| 6 | 3 | 0.55333 | 0.03055 | (*) |
| 7 | 3 | 0.25333 | 0.03055 | (*) |
| 8 | 3 | 0.36667 | 0.00577 | (*) |
| 9 | 3 | 0.42000 | 0.01000 | (*) |
| 10 | 3 | 0.29333 | 0.01528 | (*) |
| 11 | 3 | 0.06000 | 0.02646 | *) |
| 12 | 3 | 0.24333 | 0.00577 | (*) |
| 13 | 3 | 0.30000 | 0.02000 | (*) |
| 15 | 3 | 0.21333 | 0.02309 | (* |
| 17 | 3 | 0.55000 | 0.01732 | (*) |
| 18 | 3 | 0.35667 | 0.00577 | (*) |
| 19 | 3 | 0.46667 | 0.02887 | (*) |
| 20 | 3 | 0.56333 | 0.02887 | (* |
| 21 | 3 | 0.27333 | 0.00577 | (*) |
| 23 | 3 | 0.56000 | 0.01000 | *) |
| 24 | 3 | 0.38333 | 0.01528 | (*) |
| 25 | 3 | 0.08667 | 0.00577 | *) |
| 27 | 3 | 0.58667 | 0.01528 | *) |
| 28 | 3 | 0.03000 | 0.00000 | (*) |
| 29 | 3 | 0.51000 | 0.01000 | *) |
| 30 | 3 | 0.54333 | 0.00577 | (*) |
| 31 | 3 | 0.73333 | 0.03055 | (*) |
| 32 | 3 | 0.58000 | 0.01000 | (*) |
| 34 | 3 | 0.27667 | 0.01155 | (*) |
| 38 | 3 | 0.22000 | 0.00000 | (*) |
| 40 | 3 | 0.28667 | 0.00577 | *) |
| 41 | 3 | 0.50333 | 0.04619 | (*) |
| 43 | 3 | 0.54000 | 0.01732 | (* |
| 44 | 3 | 0.48333 | 0.02807 | (*) |
| 45 | 3 | 0.25333 | 0.00577 | (*) |
| 46 | 3 | 0.25667 | 0.00577 | (*) |

Pooled StDev = 0.01860        0.25    0.50    0.75

Table 1b, shows a myriad of possible constituents as candidates for slurry with adequate removal rate. Current state of the art colloidal silica slurries remove the nickel-phosphorous layer at rates from 7 mg–12 mg per minute per disk, which in comparison to this evaluation would equate to 0.252 g–0.432 g total removal. Table 1b shows thirteen slurries which surpass this current bench mark and have coded units of A6, A 17, A19, A20, A23, A27, A29, A30, A31, A32, A41, A43, and A44. In uncoded unites, these constituents are respectively aluminum nitrate, 1-hydroxyethylidene-1,1-diphosphonic acid (HEDP), sodium fluorophosphate, hydroxyphosphono acetate, phosphoric acid, citric acid, glycine, lactic acid, oxalic acid, tartaric acid, formamid acetate, aminotri (methylenephosphonic acid) (ATMP) and 2-phosphonobutane-1,2,4-tricarboxylic acid (PBTC). Each of these constituents in the presence of an oxidizer, (hydrogen peroxide in this specific example) show removal rate capabilities superior to the current state of the art.

Example 2

This example illustrates the effects and interactions of ten specific constituents. A fractional factorial design of experiment model was utilized to approximate the magnitude of interactions of ten constituents up through the third-order. This is to say that through statistical analysis of removal data, the effects individually and interactions with any one or two other constituents were evaluated. Process procedures, parameters and equipment were held constant as described in tables A and B to evaluate constituents with coded units A0, A5, A6, A17, A20, A23, A27, A29, A31 and A32. In uncoded units, those constituents were hydrogen peroxide, ethylene diamine, aluminum nitrate, HEDP, HPA, phosphoric acid, citric acid, glycine, oxalic acid and tartaric acid respectively. A design of experiment model of resolution four was utilized where the forty-two slurries were formulated according to table 2a. Further, this table describes the actual percent by weight each constituent was present in a given slurry. This is to say that in the first slurry evaluated, denoted by RunOrder 1, constituents A29, A31, A32 and A5 each were present in concentrations of 1 percent by weight of the total solution while A0 was present in 2.57 percent by weight of the total solution. Silica was held constant as described above at a percent by weight of 5.71 and the remaining weight percent was water.

TABLE 2a

| Run-Order | A6 | A17 | A20 | A23 | A27 | A29 | A31 | A32 | A5 | A0 |
|---|---|---|---|---|---|---|---|---|---|---|
| 1 | 0 | 0 | 0 | 0 | 0 | 1 | 1 | 1 | 1 | 2.57 |
| 2 | 1 | 0 | 0 | 0 | 0 | 0 | 0 | 0 | 0 | 2.57 |
| 3 | 0 | 1 | 0 | 0 | 0 | 0 | 0 | 0 | 1 | 0.00 |
| 4 | 1 | 1 | 0 | 0 | 0 | 1 | 1 | 1 | 0 | 0.00 |
| 5 | 0 | 0 | 1 | 0 | 0 | 0 | 0 | 1 | 0 | 0.00 |
| 6 | 1 | 0 | 1 | 0 | 0 | 1 | 1 | 0 | 1 | 0.00 |
| 7 | 0 | 1 | 1 | 0 | 0 | 1 | 1 | 0 | 0 | 2.57 |
| 8 | 1 | 1 | 1 | 0 | 0 | 0 | 0 | 1 | 1 | 2.57 |
| 9 | 0 | 0 | 0 | 1 | 0 | 0 | 1 | 0 | 0 | 0.00 |
| 10 | 1 | 0 | 0 | 1 | 0 | 1 | 0 | 1 | 1 | 0.00 |
| 11 | 0 | 1 | 0 | 1 | 0 | 1 | 0 | 1 | 0 | 2.57 |
| 12 | 1 | 1 | 0 | 1 | 0 | 0 | 1 | 0 | 1 | 2.57 |
| 13 | 0 | 0 | 1 | 1 | 0 | 1 | 0 | 0 | 1 | 2.57 |
| 14 | 1 | 0 | 1 | 1 | 0 | 0 | 1 | 1 | 0 | 2.57 |
| 15 | 0 | 1 | 1 | 1 | 0 | 0 | 1 | 1 | 1 | 0.00 |
| 16 | 1 | 1 | 1 | 1 | 0 | 1 | 0 | 0 | 0 | 0.00 |

TABLE 2a-continued

| Run-Order | A6 | A17 | A20 | A23 | A27 | A29 | A31 | A32 | A5 | A0 |
|---|---|---|---|---|---|---|---|---|---|---|
| 17 | 0 | 0 | 0 | 0 | 1 | 1 | 0 | 0 | 0 | 0.00 |
| 18 | 1 | 0 | 0 | 0 | 1 | 0 | 1 | 1 | 1 | 0.00 |
| 19 | 0 | 1 | 0 | 0 | 1 | 0 | 1 | 1 | 0 | 2.57 |
| 20 | 1 | 1 | 0 | 0 | 1 | 1 | 0 | 0 | 1 | 2.57 |
| 21 | 0 | 0 | 1 | 0 | 1 | 0 | 1 | 0 | 1 | 2.57 |
| 22 | 1 | 0 | 1 | 0 | 1 | 1 | 0 | 1 | 0 | 2.57 |
| 23 | 0 | 1 | 1 | 0 | 1 | 1 | 0 | 1 | 1 | 0.00 |
| 24 | 1 | 1 | 1 | 0 | 1 | 0 | 1 | 0 | 0 | 0.00 |
| 25 | 0 | 0 | 0 | 1 | 1 | 0 | 0 | 1 | 1 | 2.57 |
| 26 | 1 | 0 | 0 | 1 | 1 | 1 | 1 | 0 | 0 | 2.57 |
| 27 | 0 | 1 | 0 | 1 | 1 | 1 | 1 | 0 | 1 | 0.00 |
| 28 | 1 | 1 | 0 | 1 | 1 | 0 | 0 | 1 | 0 | 0.00 |
| 29 | 0 | 0 | 1 | 1 | 1 | 1 | 1 | 1 | 0 | 0.00 |
| 30 | 1 | 0 | 1 | 1 | 1 | 0 | 0 | 0 | 1 | 0.00 |
| 31 | 0 | 1 | 1 | 1 | 1 | 0 | 0 | 0 | 0 | 2.57 |
| 32 | 1 | 1 | 1 | 1 | 1 | 1 | 1 | 1 | 1 | 2.57 |
| 33 | 0 | 1 | 0 | 0 | 0 | 0 | 0 | 0 | 0 | 2.57 |
| 34 | 0 | 0 | 1 | 0 | 0 | 0 | 0 | 0 | 0 | 2.57 |
| 35 | 0 | 0 | 0 | 1 | 0 | 0 | 0 | 0 | 0 | 2.57 |
| 36 | 0 | 0 | 0 | 0 | 1 | 0 | 0 | 0 | 0 | 2.57 |
| 37 | 0 | 0 | 0 | 0 | 0 | 1 | 0 | 0 | 0 | 2.57 |
| 38 | 0 | 0 | 0 | 0 | 0 | 0 | 1 | 0 | 0 | 2.57 |
| 39 | 0 | 0 | 0 | 0 | 0 | 0 | 0 | 1 | 0 | 2.57 |
| 40 | 0 | 0 | 0 | 0 | 0 | 0 | 0 | 0 | 1 | 2.57 |
| 41 | 0 | 0 | 0 | 0 | 0 | 0 | 0 | 0 | 0 | 2.57 |
| 42 | 0 | 1 | 0 | 0 | 0 | 0 | 0 | 0 | 1 | 2.57 |

The quantitative results with respect to estimated effects and coefficients of this evaluation are found in table 2b. The coefficients denoted by "Coef" in table 2b indicate the magnitude of the effect of an individual constituent or interaction. The statistical significance of these results is described by a p-value which is denoted "P" in table 2b. A p-value less than 0.05 denotes a statistical significance. This is to say that when a p-value less than 0.05 is observed, these is sufficient statistical evidence to make inferences about the contribution of an individual constituent or interaction to the system with respect to removal rate.

TABLE 2b

Estimated Effects and Coefficients (coded units)

| Term | Effect | Coef | SE Coef | T | P |
|---|---|---|---|---|---|
| Constant |  | 0.3289 | 0.002580 | 123.60 | 0.000 |
| A6 | 0.0156 | 0.0078 | 0.002580 | 3.03 | 0.003 |
| A17 | −0.0598 | −0.0299 | 0.002589 | −11.59 | 0.000 |
| A20 | 0.0348 | 0.0174 | 0.002580 | 6.74 | 0.000 |
| A23 | −0.0127 | −0.0064 | 0.002580 | −2.46 | 0.016 |
| A27 | 0.0281 | 0.0141 | 0.002580 | 5.45 | 0.000 |
| A29 | −0.0352 | −0.0176 | 0.002580 | −6.82 | 0.000 |
| A31 | 0.0698 | 0.0349 | 0.002580 | 13.53 | 0.000 |
| A32 | −0.0677 | −0.0339 | 0.002580 | −13.12 | 0.000 |
| A5 | −0.0756 | −0.0378 | 0.002580 | −14.66 | 0.000 |
| A0 | 0.3390 | 0.1685 | 0.002580 | 65.70 | 0.000 |
| A6*A17 | −0.0185 | −0.0093 | 0.002580 | −3.59 | 0.001 |
| A6*A20 | −0.0131 | −0.0066 | 0.002580 | 2.54 | 0.013 |
| A6*A23 | 0.0494 | 0.0247 | 0.002580 | 9.57 | 0.000 |
| A6*A27 | −0.0340 | −0.0170 | 0.002580 | −6.58 | 0.000 |
| A6*A29 | −1.0115 | 0.5057 | 0.024878 | −20.33 | 0.000 |
| A6*A31 | −0.0140 | −0.0070 | 0.002580 | −2.71 | 0.008 |
| A6*A32 | 0.0235 | 0.0118 | 0.002580 | 4.56 | 0.000 |
| A6*A5 | 0.3246 | 0.1623 | 0.010319 | 15.73 | 0.000 |
| A6*A0 | −0.3925 | −0.1962 | 0.011392 | −17.23 | 0.000 |
| A17*A20 | 0.0090 | 0.0045 | 0.002580 | 1.74 | 0.006 |
| A17*A23 | −0.0394 | −0.0197 | 0.002580 | −7.63 | 0.000 |
| A17*A27 | 0.0698 | 0.0349 | 0.002580 | 13.53 | 0.000 |
| A17*A29 | 0.0085 | −0.0043 | 0.002580 | −1.66 | 0.102 |
| A17*A31 | 0.0131 | 0.0066 | 0.002580 | 2.54 | 0.013 |
| A17*A32 | 0.4100 | 0.2050 | 0.013772 | 14.89 | 0.000 |

TABLE 2b-continued

| | | | | | |
|---|---|---|---|---|---|
| A17*A5 | −0.1400 | 0.0700 | 0.007297 | −9.59 | 0.000 |
| A17*A0 | −0.3748 | −0.1874 | 0.010319 | −18.16 | 0.000 |
| A20*A23 | 0.0102 | 0.0051 | 0.002580 | 1.98 | 0.051 |
| A20*A27 | 0.4994 | 0.2497 | 0.013772 | 18.13 | 0.000 |
| A20*A29 | 1.1023 | 0.5511 | 0.025342 | 21.75 | 0.000 |
| A20*A31 | −0.5856 | −0.2929 | 0.013772 | −21.27 | 0.000 |
| A20*A32 | 0.1665 | 0.0832 | 0.007297 | 11.41 | 0.000 |
| A20*A5 | −0.4369 | −0.2184 | 0.013651 | −16.00 | 0.000 |
| A23*A27 | 0.0027 | 0.0014 | 0.002580 | 0.52 | 0.601 |
| A23*A29 | −0.0523 | 0.0261 | 0.002580 | −10.14 | 0.000 |
| A23*A31 | 0.1598 | 0.0799 | 0.007297 | 10.95 | 0.000 |
| A23*A32 | 0.5769 | 0.2884 | 0.013092 | 20.76 | 0.000 |
| A27*A29 | 0.2948 | 0.0974 | 0.007297 | 13.35 | 0.000 |
| A27*A32 | −1.0546 | −0.5273 | 0.025210 | 20.92 | 0.000 |
| A29*A32 | −0.5333 | −0.2667 | 0.01365.1 | −19.53 | 0.000 |
| A17*A20*A23 | 1.0433 | 0.5217 | 0.024744 | 21.08 | 0.000 |

Analysis of Variance for Sample (coded units)

| Source | DF | Seq SS | Adj SS | Adj MS | F | P |
|---|---|---|---|---|---|---|
| Main Effects | 10 | 4.29746 | 3.25494 | 0.329494 | 515.73 | 0.000 |
| 2-Way Interactions | 30 | 0.63745 | 0.67552 | 0.029184 | 45.68 | 0.000 |
| 3-Way Interactions | 1 | 0.28397 | 0.28397 | 0.283968 | 444.47 | 0.000 |
| Residual Error | 84 | 0.05367 | 0.05367 | 0.000639 | | |
| Pure Error | 84 | 0.05367 | 0.05367 | 0.000639 | | |
| Total | 125 | 0.25655 | | | | |

The beneficial second order interactions obtained from this evaluation are as follows:
Beneficial Interactions
HEDP:Ethylenediamine (slightly significant)
Aluminum Nitrate:Tartaric Acid
Aluminum Nitrate:Glycine
Aluminum Nitrate:Phosphoric Acid
Aluminum Nitrate:Glycine
Phosphoric Acid:HPA (slightly significant)
Citric Acid:HEDP
HPA:Glycine
Aluminum Nitrate:Ethylenediamine (slightly significant)
Citric Acid:Ethylenediamine
HPA:Glycine
Citric Acid:HPA:Glycine
HPA:Ethylenediamine
Phosphoric Acid:Citric Acid
Citric Acid:Glycine (slightly significant)

Example 3

Example 3 illustrates the effects and interactions more specifically of constituents, in coded units, A17, A20, A23, A27 and A29. These constituents in uncoded units are HEDP, HPA, phosphoric acid, citric acid and glycine respectively. Again, process procedures, parameters and equipment were held constant as described in tables A and B. Silica was present in each slurry at a concentration of 5.71 percent by weight of the total solution. Hydrogen peroxide in a 35 percent by weight solution was held constant in each slurry at a level of 2.57 percent by weight of the total solution. A fractional factorial design of experiment model was created to incorporate these chemistries. By so doing, nineteen slurries were formulated and quantitatively analyzed by examining removal rate data. The design of experiment model is defined in table 3a. A statistical analysis of this data is found in table 3b where the estimated effects and coefficients of individual constituents and interactions up through the fourth order are displayed.

TABLE 3a

| Run Order | A17 | A27 | A29 | A20 | A23 |
|---|---|---|---|---|---|
| 1 | 0.1 | 0.1 | 0.1 | 0.1 | 0 |
| 2 | 1.1 | 0.1 | 0.1 | 0.1 | 0 |
| 3 | 0.1 | 1.1 | 0.1 | 0.1 | 0 |
| 4 | 1.1 | 1.1 | 0.1 | 0.1 | 0 |
| 5 | 0.1 | 0.1 | 1.1 | 0.1 | 0 |
| 6 | 1.1 | 0.1 | 1.1 | 0.1 | 0 |
| 7 | 0.1 | 1.1 | 1.1 | 0.1 | 0 |
| 8 | 1.1 | 1.1 | 1.1 | 0.1 | 0 |
| 9 | 0.1 | 0.1 | 0.1 | 1.1 | 0 |
| 10 | 1.1 | 0.1 | 0.1 | 1.1 | 0 |
| 11 | 0.1 | 1.1 | 0.1 | 1.1 | 0 |
| 12 | 1.1 | 1.1 | 0.1 | 1.1 | 0 |
| 13 | 0.1 | 0.1 | 1.1 | 1.1 | 0 |
| 14 | 1.1 | 0.1 | 1.1 | 1.1 | 0 |
| 15 | 0.1 | 1.1 | 1.1 | 1.1 | 0 |
| 16 | 1.1 | 1.1 | 1.1 | 1.1 | 0 |
| 17 | 1.0 | 1.0 | 0.0 | 0.0 | 1 |
| 18 | 1.0 | 1.0 | 0.0 | 0.0 | 1 |
| 19 | 1.0 | 1.0 | 0.0 | 0.0 | 1 |

TABLE 3b

Estimated Effects and Coefficients for Sample (uncoded units)

| Term | Effect | Coef | SE Coef | T | P |
|---|---|---|---|---|---|
| Constant |  | 0.53518 | 0.007564 | 70.76 | 0.000 |
| A17 | 0.05403 | 0.02701 | 0.002743 | 9.85 | 0.000 |
| A27 | 0.02744 | 0.01372 | 0.002743 | 5.00 | 0.000 |
| A29 | −0.04166 | −0.02083 | 0.003003 | 6.94 | 0.000 |
| A20 | −0.04533 | −0.02266 | 0.003003 | −7.55 | 0.000 |
| A23 | 0.01349 | 0.00674 | 0.007677 | 0.88 | 0.385 |
| A17*A27 | −0.03435 | −0.01717 | 0.002743 | −6.26 | 0.000 |
| A17*A29 | −0.02003 | 0.01001 | 0.003003 | −3.34 | 0.002 |
| A17*A20 | −0.03286 | 0.01643 | 0.003003 | −5.47 | 0.000 |
| A27*A29 | −0.02727 | −0.01364 | 0.003003 | −4.54 | 0.000 |
| A27*A20 | −0.03460 | −0.01730 | 0.003003 | −5.76 | 0.000 |
| A29*A20 | −0.04084 | −0.02042 | 0.003287 | 6.21 | 0.000 |
| A17*A27*A29 | 0.03630 | 0.01817 | 0.003003 | 6.05 | 0.000 |
| A17*A27*A20 | 0.03451 | 0.01726 | 0.003003 | 5.75 | 0.000 |
| A17*A29*A20 | 0.04386 | 0.02193 | 0.003287 | 6.67 | 0.000 |
| A27*A29*A20 | 0.03277 | 0.01639 | 0.003287 | 4.99 | 0.000 |
| A17*A27*A29*A20 | −0.00151 | −0.00076 | 0.003287 | −0.23 | 0.819 |

Analysis of Variance for Sample (coded units)

| Source | DF | Seq SS | Adj SS | Adj MS | F | P |
|---|---|---|---|---|---|---|
| Main Effects | 5 | 0.117544 | 0.100321 | 0.0200643 | 56.66 | 0.000 |
| 2-Way Interactions | 6 | 0.049612 | 0.060841 | 0.0101402 | 28.63 | 0.000 |
| 3-Way Interactions | 4 | 0.049292 | 0.048996 | 0.0122491 | 34.59 | 0.000 |
| 4-Way Interactions | 1 | 0.000019 | 0.000019 | 0.0000187 | 0.05 | 0.819 |

Table 3a depicts the levels at which each of the constituents were evaluated. For example, in addition to silica and hydrogen peroxide which were afore mentioned, slurry number 3, indicated by RunOrder 3, comprised 0.1 percent A17, 1.1 percent A27, 0.1 percent A29, 0.1 percent A20 and no A23. Each of the percentages described above are indicative of a percent by weight of the total slurry. The significance of this example is that A29 and A20 are shown to have an adverse effect on removal rate when in the presence of all the other constituents in this specific evaluation. Approximate values of said negative impacts in this specific system are found in table 3b and are characterized by their estimated coefficients; denoted by "Coef".

Example 4

Example 4 depicts the effects of individual constituents and interactions of the preferred constituents in this invention. In coded units, these constituents are A0, A17, A23 and A27. Respectively, these constituents in uncoded units are hydrogen peroxide, HEDP, phosphoric acid and citric acid. All procedures, parameters and equipment were held constant as described in tables A and B. A fractional factorial design of experiment model was utilized to determine the magnitude of contributions with respect to removal rate of each constituent. The fractional factorial design of experiment model is portrayed in table 4a. Silica was present as 5.71 percent by total weight of each slurry. Ammonium hydroxide was utilized to standardize the pH throughout the evaluation at 2.5. Quantitative statistical analysis of the results of this example is available in table 4b. The concentrations of each constituent in each slurry is depicted in table 4a. For example, the first slurry evaluated, denoted by RunOrder 1, comprised of 0.25 weight percent A17, 0.25 weight percent A23, 0.27 weight percent A27 and 1.29 weight percent A0. Said weight percent values are indicative of total weight percent.

TABLE 4a

| Run Order | A17 | A23 | A27 | A0 |
|---|---|---|---|---|
| 1 | 0.25 | 0.25 | 0.25 | 1.29 |
| 2 | 1.25 | 0.25 | 0.25 | 3.86 |
| 3 | 0.25 | 1.25 | 0.25 | 3.86 |
| 4 | 1.25 | 1.25 | 0.25 | 1.29 |
| 5 | 0.25 | 0.25 | 1.25 | 3.86 |
| 6 | 1.25 | 0.25 | 1.25 | 1.29 |
| 7 | 0.25 | 1.25 | 1.25 | 1.29 |
| 8 | 1.25 | 1.25 | 1.25 | 3.86 |

TABLE 4b

Estimated Effects and Coefficients for Sample (coded units)

| Term | Effect | Coef | SE Coef | T | P |
|---|---|---|---|---|---|
| Constant |  | 0.59000 | 0.003773 | 156.37 | 0.000 |
| A17 | 0.04167 | 0.02093 | 0.003773 | 5.52 | 0.000 |
| A23 | 0.50000 | 0.02500 | 0.003773 | 6.63 | 0.000 |
| A27 | −0.02367 | −0.01083 | 0.003773 | −2.87 | 0.011 |
| A0 | 0.03667 | 0.01833 | 0.003773 | 4.86 | 0.000 |
| A17*A23 | −0.03833 | −0.01917 | 0.003773 | 5.88 | 0.000 |
| A17*A27 | 0.00333 | 0.00167 | 0.003773 | 0.44 | 0.665 |
| A17*A0 | −0.00500 | −0.00250 | 0.003773 | −0.66 | 0.517 |

Analysis of Variance for Sample (coded units)

| Source | DF | Seq SS | Adj SS | Adj MS | F | P |
|---|---|---|---|---|---|---|
| Main Effects | 4 | 0.036300 | 0.036300 | 0.0090750 | 26.56 | 0.000 |
| 2-Way Interactions | 3 | 0.009033 | 0.009033 | 0.0030111 | 8.81 | 0.001 |
| Residual Error | 16 | 0.005467 | 0.005467 | 0.0003417 |  |  |
| Pure Error | 16 | 0.005467 | 0.005467 | 0.0003417 |  |  |
| Total | 23 | 0.050800 |  |  |  |  |

This example illustrates the significant interactions between the preferred constituents in this invention up through the second order.

Example 5

This example illustrates the performance capability of this invention. All process parameters and equipment were held constant as described in Tables A and B when slurry comprising hydrogen peroxide, citric acid, HEDP, phosphoric acid, ammonium hydroxide, silica and water was evaluated.

Thirty different runs were performed according to tables A and B. The removal and surface roughness data from these thirty runs were statistically analyzed. Removal rate data is portrayed graphically in FIG. 1 while surface roughness data is portrayed in FIG 2. The data acquired from this example depicts a mean removal rate of 18.37 mg/min/disk. Accompanying this mean removal rate is a standard deviation of 0.779 mg/min/disk. The surface of the nickel-phosphorous after polishing with this invention is void of defects. Defects are defined as any interruption in the nickel-phosphorous lattice having depth or height greater than twelve angstroms. This is observed through the surface roughness data obtained from this evaluation. A mean surface roughness of 1.47 angstroms was observed with a standard deviation of 0.17 angstroms. This value of 1.47 angstroms is indicative of the surface condition of the substrate. As measured on a TMS 2000, manufactured by Schmitt Inc., the average difference from peak to valley on the surface of the disks measured was 1.47 angstroms.

Figure 2:
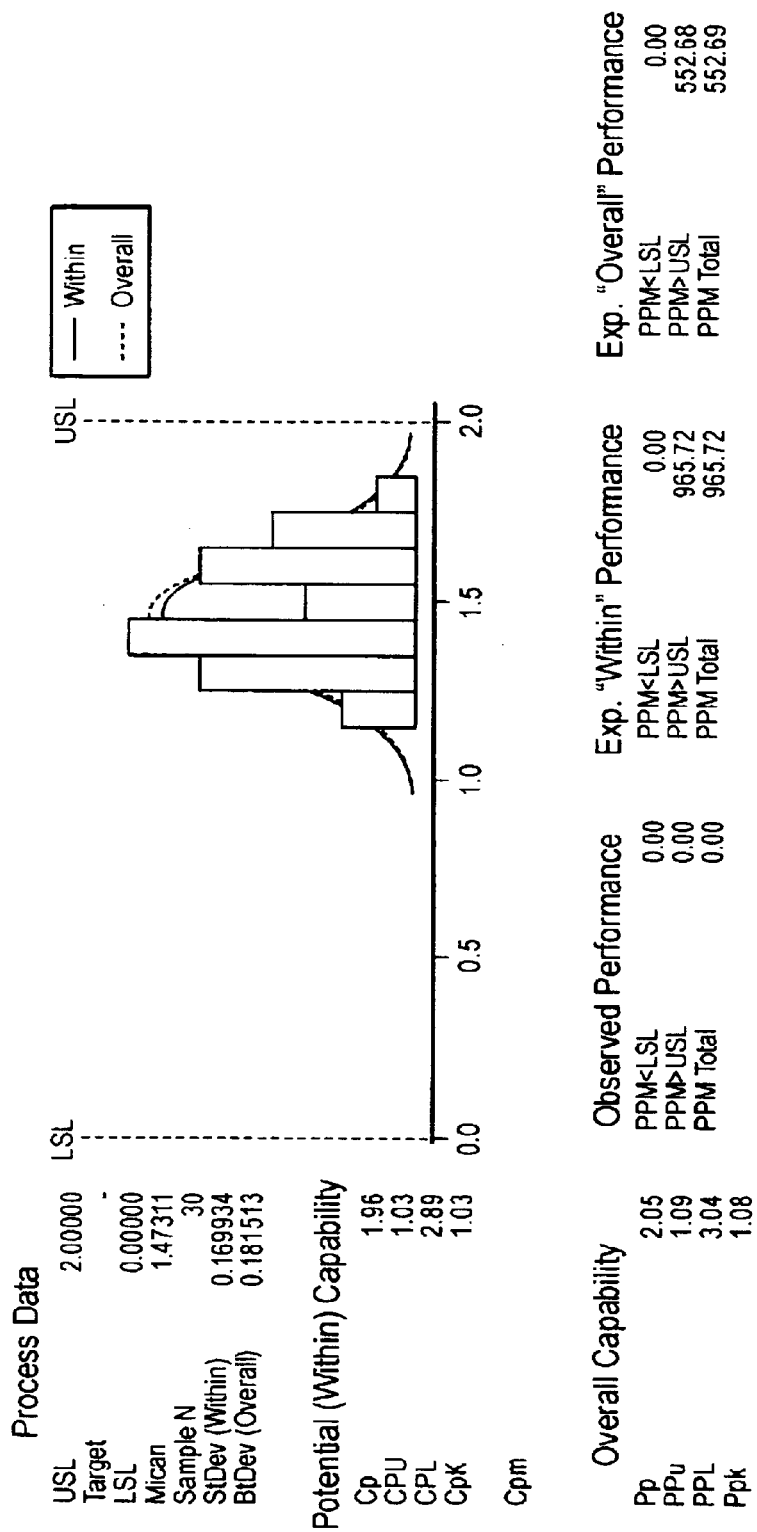
FIG. 2 is a statistical analysis diagram of surface roughness data.

Table 5a:
Table 5b:

The chemistry utilized to obtain the data depicted in FIGS. 1 and 2 are by what the following claims are made.

We claim:

1. A CMP formulation which comprises a dispersion of abrasive particles with particle sizes from 15 to 80 nanometers and selected from the group consisting of silica, alumina, titania, ceria, zirconia and mixtures thereof dispersed in a formulation comprising:
   a. an oxidant;
   b. a moderator of the action of the oxidizing agent which comprises a phosphate or phosphite group;
   c. a first accelerant comprising phosphonate groups;
   d. a second accelerant comprising amine or ammonium groups; and
   e. water.

2. A formulation according to claim 1 in which the formulation further comprises an organic carboxylic acid.

3. A formulation according to claim 2 in which the organic carboxylic acid is selected from the group consisting of citric acid, oxalic acid, lactic acid, tartaric acid, glycine and mixtures of such acids.

4. A formulation according to claim 3 in which the organic carboxylic acid is present in an amount that is from 2 to 10 wt % of the formulation.

5. A formulation according to claim 1 in which the abrasive particles are silica particles with a volume average particle size of 15 to 60 nanometers.

6. A formulation according to claim 1 in which the amount of abrasive in the formulation is from 2 to 10 wt % of the weight of the formulation.

7. A formulation according to claim 1 in which the oxidizing agent is selected from the group consisting of peroxides, periodates, percarbamates and mixtures thereof.

8. A formulation according to claim 7 in which the oxidizing agent is hydrogen peroxide in a concentration of from 0.1 to 6 wt % of the formulation weight.

9. A formulation according to claim 1 in which the moderator is selected from the group consisting of compounds having the group —$PO_x$, where x is from 1 to 4, and mixtures thereof.

10. A formulation according to claim 9 in which the moderator is present in the formulation in an amount that represents from 0.1 to 6 wt % of the formulation weight.

11. A formulation according to claim 1 in which the first accelerant is selected from the group consisting of 1-hydroxyethylidene-1,1-diphosphonic acid (HEDP), aminotri (methylenephosphonic acid) (ATMP), N-(2-hydroxyethyl)-N, N-di(methylenephosphonic acid) (HEMPA), 2-phosphonobutane-1,2,4-tricarboxylic acid (PBTC) and mixtures thereof.

12. A formulation according to claim 11 in which the first accelerant is present in the formulation in an amount that i from 0.1 to 6 wt % of the formulation weight.

13. A formulation according to claim 1 in which the second accelerant is selected from the group consisting of ammonium hydroxide, ammonium salts such ammonium nitrate, urea, formamide acetate, biuret, ethylene diamine, glycine and mixtures of such compounds.

14. A formulation according to claim 13, in which the second accelerant is present in the formulation in an amount that is from 0.1 to 6 wt % of the formulation weight.

15. A process for the chemical-mechanical planarization of the surface of a nickel/phosphorus alloy containing from 9 to 12% of phosphorus which comprises polishing the surface in the presence of a slurry comprising a dispersion of abrasive particles with particle sizes from 15 to 60 nanometers and selected from the group consisting of silica, alumina, titania, ceria, zirconia and mixtures thereof dispersed in a formulation comprising:
   a. an oxidant;
   b. a moderator of action of the oxidizing agent which comprises a phosphate or phosphite group;
   c. a first accelerant comprising phosphonate groups;
   d. a second accelerant comprising amine or ammonium groups; and
   e. water.

16. A process according to claim 15 in which an organic carboxylic acid is added to the formulation.

17. A process according to claim 16 in which the organic carboxylic acid is selected from the group consisting of citric acid, oxalic acid, lactic acid, tartaric acid, glycine and mixtures of such acids.

18. A process according to claim 17 in which the organic carboxylic acid is added to the formulation in an amount that is from 2 to 10 wt % of the formulation.

19. A process according to claim 18 in which the abrasive particles are silica particles with a volume average particle size of 15 to 60 nanometers.

20. A process according to claim 15 in which the amount of abrasive incorporated into the formulation is from 2 to 10% of the weight of the formulation.

21. A process according to claim 15 in which the oxidizing agent is selected from the group consisting of peroxides, periodates, percarbamates and mixtures thereof.

22. A process according to claim 21 in which the oxidizing agent is hydrogen peroxide in a concentration of from 0.1 to 6 wt % of the formulation weight.

23. A process according to claim 15 in which the moderator is selected from the group consisting of compounds having the group —$PO_x$, where x is from 1 to 4, and mixtures thereof.

24. A process according to claim 23 in which the moderator is present in the formulation in an amount that represents from 0.1 to 6 wt % of the formulation weight.

25. A process according to claim 15 in which the first accelerant is selected from the group consisting of 1-hydroxyethylidene-1,1-diphosphonic acid (HEDP), aminotri (methylenephosphonic acid) (ATMP), N-(2-hydroxyethyl])-N, N-di(methylenephosphonic acid) (HEMPA), 2-phosphonobutane-1,2,4-tricarboxylic acid (PBTC) and mixtures thereof.

26. A process according to claim 25 in which the first accelerant is present in the formulation in an amount that is from 0.1 to 6 wt % of the formulation weight.

27. A process according to claim 15 in which the second accelerant is selected from the group consisting of ammonium hydroxide, ammonium salts such ammonium nitrate, urea, formamide acetate, biuret, ethylene diamine, glycine and mixtures of such compounds.

28. A process according to claim 27 in which the second accelerant is present in the formulation in an amount that is from 0.1 to 6 wt % of the formulation weight.

* * * * *